United States Patent
Bae et al.

(10) Patent No.: US 9,007,013 B2
(45) Date of Patent: Apr. 14, 2015

(54) INVERTER CONTROL METHOD AND SYSTEM FOR ECO-FRIENDLY VEHICLE

(71) Applicant: Hyundai Motor Company, Seoul (KR)

(72) Inventors: Su Hyun Bae, Daegu (KR); Won Kyoung Choi, Gyeonggi-do (KR); Sung Kyu Kim, Gyeonggi-do (KR); Mu Shin Kwak, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 183 days.

(21) Appl. No.: 13/717,238

(22) Filed: Dec. 17, 2012

(65) Prior Publication Data

US 2014/0103854 A1   Apr. 17, 2014

(30) Foreign Application Priority Data

Oct. 17, 2012   (KR) .................. 10-2012-0115174

(51) Int. Cl.
*H02P 1/46* (2006.01)
*H02P 6/14* (2006.01)
*H02P 27/08* (2006.01)
*B60L 11/18* (2006.01)

(52) U.S. Cl.
CPC ............... *H02P 6/14* (2013.01); *H02P 27/085* (2013.01); *B60L 11/1803* (2013.01); *B60L 2200/10* (2013.01); *B60L 2200/18* (2013.01); *B60L 2200/32* (2013.01); *B60L 2200/36* (2013.01); *B60L 2240/421* (2013.01); *Y02T 10/7005* (2013.01); *Y02T 10/642* (2013.01); *Y02T 10/70* (2013.01)

(58) Field of Classification Search
USPC .............. 318/721, 400.17, 400.25, 562, 636, 318/803, 811, 805
See application file for complete search history.

(56) References Cited

U.S. PATENT DOCUMENTS

2008/0303470 A1* 12/2008 Schulz et al. ................. 318/562
2010/0020581 A1*  1/2010 Mazzola et al. .............. 363/132

FOREIGN PATENT DOCUMENTS

| JP | 05328738 A | 12/1993 |
| JP | 09103002 A | 4/1997 |
| JP | 2009118544 A | 5/2009 |
| JP | 2009291019 A | 12/2009 |
| KR | 10-2010-0083198 | 7/2010 |

\* cited by examiner

*Primary Examiner* — Karen Masih
(74) *Attorney, Agent, or Firm* — Mintz Levin Cohn Ferris Glovsky and Popeo, P.C.; Peter F. Corless

(57) ABSTRACT

Disclosed is an inverter control system and method for an eco-friendly vehicle, by which overall improvements can be obtained in terms of switching loss, electromagnetic performance, noise-vibration-harshness (NVH) performance, control stability, and so forth, when compared to a conventional case in which one fixed switching frequency and one fixed sampling frequency are used over the entire operation area. To this end, the inverter control method for an eco-friendly vehicle which generates a pulse width modulation (PWM) signal according to a switching frequency and a sampling frequency and controls ON/OFF driving of a switching element, in which a controller changes and sets the switching frequency according to a current motor speed, changes and sets a sampling frequency according to the switching frequency, and controls on/off driving of a switching element according to the switching frequency corresponding to the motor speed and the sampling frequency.

12 Claims, 6 Drawing Sheets

INVERTER CONTROL METHOD AND SYSTEM FOR ECO-FRIENDLY VEHICLE

CROSS-REFERENCE TO RELATED APPLICATION

This application claims under 35 U.S.C. §119(a) the benefit of Korean Patent Application No. 10-2012-0115174 filed on Oct. 17, 2012, the entire contents of which are incorporated herein by reference.

BACKGROUND (a) Technical Field

The present invention relates to an inverter control method and system for an eco-friendly vehicle, and more particularly, to an inverter control method and system for an eco-friendly vehicle, by which overall improvements can be made in terms of switching loss, electromagnetic performance, noise-vibration-harshness (NVH) performance, control stability, etc., when compared to a conventional control methods in which one fixed switching frequency and one fixed sampling frequency are used over the entire operation area.

(b) Background Art

As is well known, eco-friendly vehicles such as pure electric vehicles (EVs), hybrid electric vehicles (HEVs), fuel-cell electric vehicles (FCEVs), etc., use an electric motor as at least one driving source for vehicle driving. In particular, direct-current (DC) power stored in a main battery of a vehicle is transformed into three-phase alternating-current (AC) power via an inverter between the battery and drive a motor, and a driving force of the motor is transferred to a driving wheel to allow vehicle driving.

In an eco-friendly vehicle, kinetic energy is transformed into electric energy via regenerative braking during deceleration and the electric energy is stored in a battery, and thereafter, while the vehicle driving, the energy stored in the battery is recycled back into driving the motor (e.g., the collected electric energy is recycled as kinetic energy to be utilized by the vehicle to, for example, recharge the battery), thereby improving fuel efficiency.

The motor system, which typically includes a motor, which is operated as a driving source for an eco-friendly vehicle, and an inverter, has several problems associated therewith such as a noise occurring during driving operation/regenerating operation, efficiency degradation caused by switching loss, electromagnetic performance degradation, and so forth.

Generally, if a switching frequency of an inverter increases, noise decreases; as the switching frequency decreases, inverter efficiency and fuel efficiency may be improved. That is, if the inverter's switching frequency is set to a low fixed frequency (e.g., a base switching frequency is fixed to 4 kHz), electromagnetic performance may be good. However, a significant amount of noise is generated.

When the base switching frequency is set to be high over the entire operational area to reduce the inverter's noise (for example, the base switching frequency is fixed to 8 kHz), NVH performance becomes better (i.e., pulse width modulation (PWM) current ripple is reduced), but electromagnetic performance is deteriorated and switching loss increases (i.e., leading to degradation of heel hold performance in vehicle constraint conditions), such that inverter efficiency and fuel efficiency are degraded as well.

As to electromagnetic performance, as the switching frequency increases, radiated electromagnetic noise increases (e.g., as a result, for example, AM radio reception becomes poor); as the switching frequency decreases, radiated noise decreases and thus electromagnetic performance becomes better.

In a conventional eco-friendly vehicle, to reduce inverter noise which may be sensitively perceived or may displeasing to a driver or a passenger, the inverter's switching frequency is often set high and fixed (e.g., to 8 kHz) and sampling frequency for obtaining information such as sensing current and (estimated) rotor position for controlling the inverter is set equal to the switching frequency (8 kHz) (similarly with the following single sampling scheme).

Herein, a switching frequency (i.e., switching period) may be defined as a period in which ON/OFF of a separate switch in the inverter is repeated once, respectively, and a sampling frequency corresponds to a control period in controlling inverter's current, in which the control period may be defined as a period of repeating rotor position information, a current control operation, duty calculation, and a duty update.

However, in a conventional case, one switching frequency is fixed and used over the entire operation area without any consideration of a motor driving conditions or the like (that is, a fixed frequency scheme is used), resulting in high switching loss caused by heat emission of a switching element and in weakness of electromagnetic performance.

Moreover, when a sampling frequency is high, although inverter control stability becomes better, a load on a processor executing the control increases because the processor has to obtain control parameters such as sensing current, motor angular information, etc., in a shorter period of time and calculate a larger number of control values the processor may become overloaded.

Therefore, it is necessary to control a switching frequency and a sampling frequency according to a driving condition by considering NVH performance, electromagnetic performance, switching loss, control stability, a processor load factor, etc.

That is, in a conventional system, as the switching frequency is set and fixed at a high rate over the entire operational area, there are apparent disadvantages such as electromagnetic performance degradation and switching loss increase as well as some advantages. Consequently, there is a need for a control technique for properly changing a switching frequency according to a driving condition for overall performance improvement and properly adjusting a sampling frequency according to the changed switching frequency.

SUMMARY OF THE DISCLOSURE

Accordingly, the present invention has been made to solve the foregoing problem, and provides an inverter control system and method for an eco-friendly vehicle, by which overall improvement may be obtained in terms of switching loss, electromagnetic performance, NVH performance, control stability, etc., when compared to a conventional control method in which one fixed switching frequency and one fixed sampling frequency are used over the entire operation area.

According to an aspect of the present invention, there is provided an inverter control system and method for an eco-friendly vehicle which generates a pulse width modulation (PWM) signal according to a switching frequency and a sampling frequency and controls to ON/OFF driving of a switching element, in which a controller changes and sets the switching frequency according to a current motor speed, changes and sets a sampling frequency according to the switching frequency, and controls on/off driving of a switching element according to the switching frequency corresponding to the motor speed and the sampling frequency.

According to another aspect of the present invention, there is provided an inverter control method for an eco-friendly vehicle which generates a pulse width modulation (PWM) signal according to a switching frequency and a sampling frequency and controls ON/OFF driving of a switching element, in which after a controller determines a base switching frequency according to a current motor speed, the controller changes and sets the switching frequency and a sampling frequency to values corresponding to a current motor operation state from the base switching frequency, and controls on/off driving of a switching element according to the switching frequency and the sampling frequency.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

DETAILED DESCRIPTION

Figure 1:
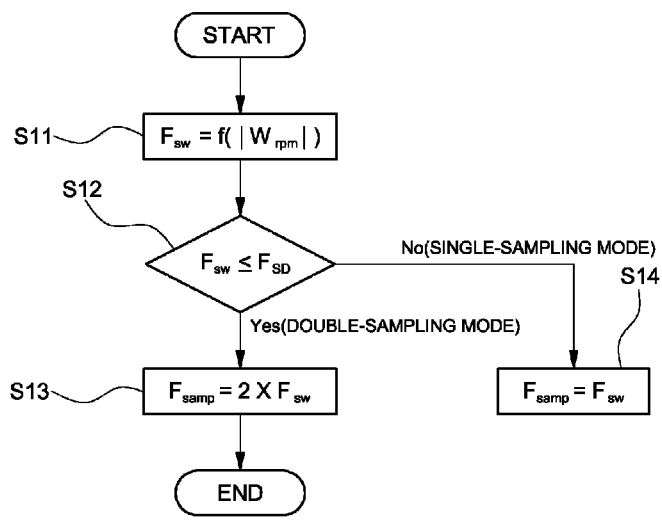
FIG. 1 is a flowchart of an inverter control method according to a first exemplary embodiment of the present invention.

Hereinafter, the present invention will be described in detail with reference to the accompanying drawings to allow those of ordinary skill in the art to easily carry out the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that the below methods are executed by at least one controller. The term controller refers to a hardware device that includes a memory and a processor. The memory is configured to store the modules and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a to distributed fashion, e.g., by a telematics server or a Controller Area Network (CAN).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 2:
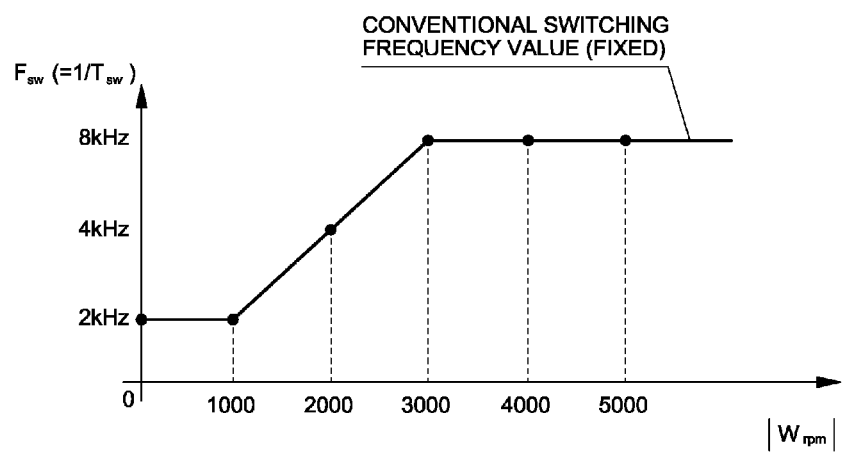
FIG. 2 is a diagram showing a state where a switching frequency is variable-controlled (continuous-variable-controlled) in an inverter control method according to a first exemplary embodiment of the present invention.

FIG. 1 is a flowchart of an inverter control method according to a first exemplary embodiment of the present invention, and FIG. 2 is a diagram showing a state where a switching frequency $F_{sw}$ is variable-controlled (continuous-variable-controlled) in an inverter control method according to a first embodiment of the present invention. In FIG. 2, a conventional fixed switching frequency (e.g., about 8 kHz) is also shown.

Figure 3:
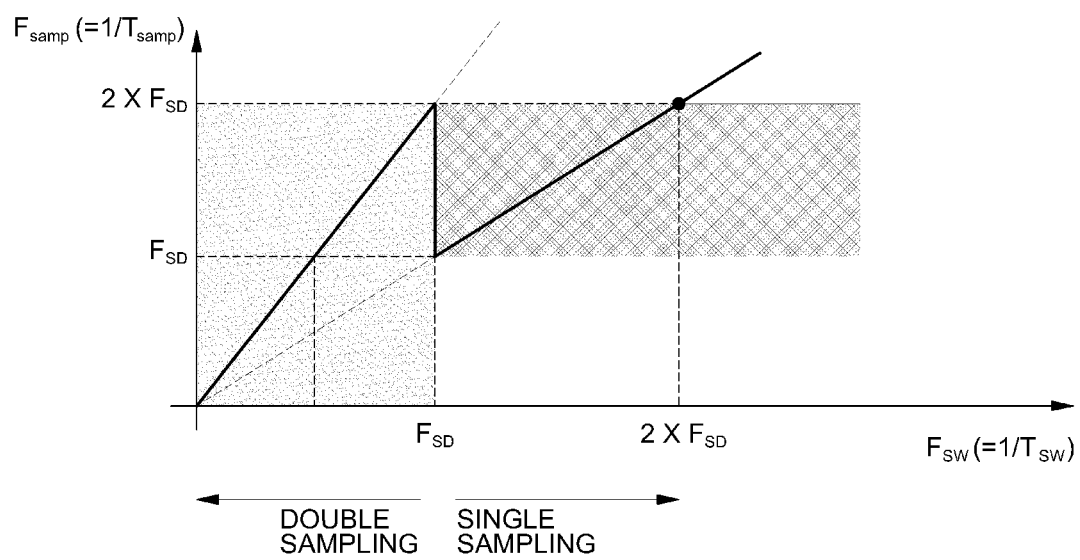
FIG. 3 is a diagram showing a transition scheme of a sampling frequency in an inverter control method according to a first exemplary embodiment of the present invention.

FIG. 3 is a diagram showing a transition scheme of a sampling frequency $F_{samp}$ in an inverter control method according to the first exemplary embodiment of the present invention, in which the sampling frequency $F_{samp}$ changes with the switching frequency $F_{sw}$ and transition (single sampling<->double sampling) is performed in a particular condition.

In first exemplary embodiment of the present invention, an inverter switching frequency may be variable-controlled according to a vehicle's driving condition, and a sampling frequency may be properly controlled according to the changed switching frequency, thereby achieving switching loss reduction and electromagnetic performance improvement.

First, a controller may be configured to monitor a current motor speed $W_{rpm}$ and variably control the inverter switching frequency $F_{sw}$ according to the current motor speed $W_{rpm}$. Herein, the motor speed $W_{rpm}$ may be a motor speed calculated by a speed calculator (differentiator executed by a processor within the controller) based on an absolute angular position θ detected by a motor's resolver.

In standard motor and inverter control, once the absolute angular position θ is detected by a resolver mounted on a motor, it is input to the speed calculator which then calculates the motor speed $W_{rpm}$ for use in the control. Thus, in the exemplary embodiment, the controller may variably control the switching frequency $F_{sw}$ according to the motor speed to $W_{rpm}$. The switching frequency $F_{sw}$ is calculated as a value which changes with the motor speed $W_{rpm}$, such that as the motor speed $W_{rpm}$ changes, the switching frequency $F_{sw}$ also changes correspondingly.

Referring to FIG. 1, in step S11 in which the switching frequency $F_{sw}$ is calculated according to the motor speed $W_{rpm}$, the switching frequency $F_{sw}$ is determined by a function of an absolute value of the motor speed $W_{rpm}$, that is, $|W_{rpm}|$.

Once the changed value of the switching frequency is determined according to the motor speed in this way, by using the changed switching frequency, through a known process of generating a pulse width modulation (PWM) signal, on/off driving of a switching element in an inverter (e.g., an insulated gate bipolar transistor (IGBT) of an IGBT power module) which converts direct-current (DC) power into three-phase alternating-current (AC) power is controlled.

FIG. 2 is a diagram showing a continuous variable state of a switching frequency in which data information which previously defines the switching frequency $F_{sw}$ corresponding to the motor speed $W_{rpm}$ (or functional formula (equation) information which defines a relationship between a motor speed and a switching frequency) as shown in FIG. 2 may be used to continuously change the switching frequency according to the motor speed, and by using this data information (previously stored within the memory in the controller), the controller calculates and changes the switching frequency corresponding to the current motor speed.

Referring to FIG. 2, a continuous increase or decrease pattern of the switching frequency $F_{sw}$ according to increase or decrease of the motor speed $W_{rpm}$ is shown, and in the present invention, the inverter's switching frequency $F_{sw}$ is determined by the motor speed $W_{rpm}$ and the switching frequency $F_{sw}$ is controlled to have a pattern which continuously changes according to the motor speed $W_{rpm}$. When the switching frequency $F_{sw}$ is determined and variably controlled according to the motor speed $W_{rpm}$, as shown in FIG. 2, the switching frequency is controlled to increase or decrease in proportion to an increase or decrease of the motor speed. That is, the switching speed corresponding to the motor speed is determined and controlled to be a higher value as the motor speed increases (also as the motor speed decreases, the switching frequency also decreases).

The data information of FIG. 2 is previously set such that as the motor speed $W_{rpm}$ (more specifically, an absolute value of the motor speed) increases, the switching frequency $F_{sw}$ has a higher value, and in control of an actual vehicle, the switching frequency is continuously changed proportionally according to the motor speed change by using the previously set data information.

In FIG. 2, 8 kHz is a conventionally fixed base switching frequency value. In the present invention, the switching frequency $F_{sw}$ is variably controlled below the conventional base switching frequency value according to driving conditions, i.e., the motor speed $W_{rpm}$, such that in the motor's low speed area, the switching frequency is properly reduced, thereby reducing switching loss and securing electromagnetic performance.

The sampling frequency $F_{samp}$ may be variably determined according to the switching frequency $F_{sw}$ determined by the motor speed $W_{rpm}$, and the switching frequency $F_{sw}$ may be compared with a previously set reference frequency $F_{SD}$ in step S12. When the switching frequency is lower than the reference frequency, the inverter is controlled in a double-sampling mode ($F_{samp}=2\times F_{sw}$) which uses a frequency that is two times the switching frequency as the sampling frequency in step S13. That is, if the switching frequency $F_{sw}$ is lower than the reference frequency $F_{SD}$, the sampling frequency $F_{samp}$ is determined to be two times the switching frequency $F_{sw}$, i.e., $2\times F_{sw}$.

On the other hand, in an area where the switching frequency $F_{sw}$ exceeds the reference frequency $F_{SD}$, the sampling frequency $F_{samp}$ is determined to be the same frequency as the switching frequency in step S14, and the inverter is controlled in a single-sampling mode ($F_{samp}=F_{sw}$) which uses the same frequency as the switching frequency as the sampling frequency.

Herein, the reference frequency serves as a criterion for transition between the single-sampling mode ($F_{samp}=F_{sw}$) and the double-sampling mode ($F_{samp}=2\times F_{sw}$), and the reference frequency is previously determined after a pre-test with respect to a motor system having the same specifications. Referring to FIG. 3, in an area where the switching frequency $F_{sw}$ is lower than the reference frequency $F_{SD}$, and in an area where the switching frequency $F_{sw}$ exceeds the reference frequency $F_{SD}$, the inverter is controlled in the double-sampling mode (step S13) and the single-sampling mode (step S14), respectively.

Since the switching frequency changes with increase or decrease in the motor speed, the sampling frequency also changes with increase or decrease of the motor speed. However, double sampling and single sampling are determined according to whether the switching frequency is lower or higher than the reference frequency, and when the switching frequency increases or decreases around the reference frequency, discontinuous change of the sampling frequency, that is, mode transition between double sampling and single sampling, occurs.

As such, in the first exemplary embodiment of the present invention, the switching frequency continuously varies with the motor speed and mode transition between double sampling and single sampling is made based on a particular speed of the motor. That is, the inverter is controlled in the double-sampling mode in which the sampling frequency is set two times the switching frequency, in the low-speed area of the motor (in which the switching frequency corresponding to the motor speed is less than the reference frequency), and in the single-sampling mode in which the sampling frequency is set to be equal to the switching frequency, in the high-speed area (i.e., when the switching frequency exceeds the reference frequency).

In the present invention, the single-sampling mode may be defined as a digital control mode in which one control period occurs during one switching period, and the double-sampling mode may be defined as a digital control mode in which two control periods to occur during one switching period. In the double-sampling mode, independent duty change for each of an ON sequence and an OFF sequence may be possible. With the control method according to the present invention, a lower switching frequency than with a conventional case can be used in the low-speed area of the motor, thereby reducing switching loss and securing electromagnetic performance.

Next, a second exemplary embodiment of the present invention will be described.

Figure 4:
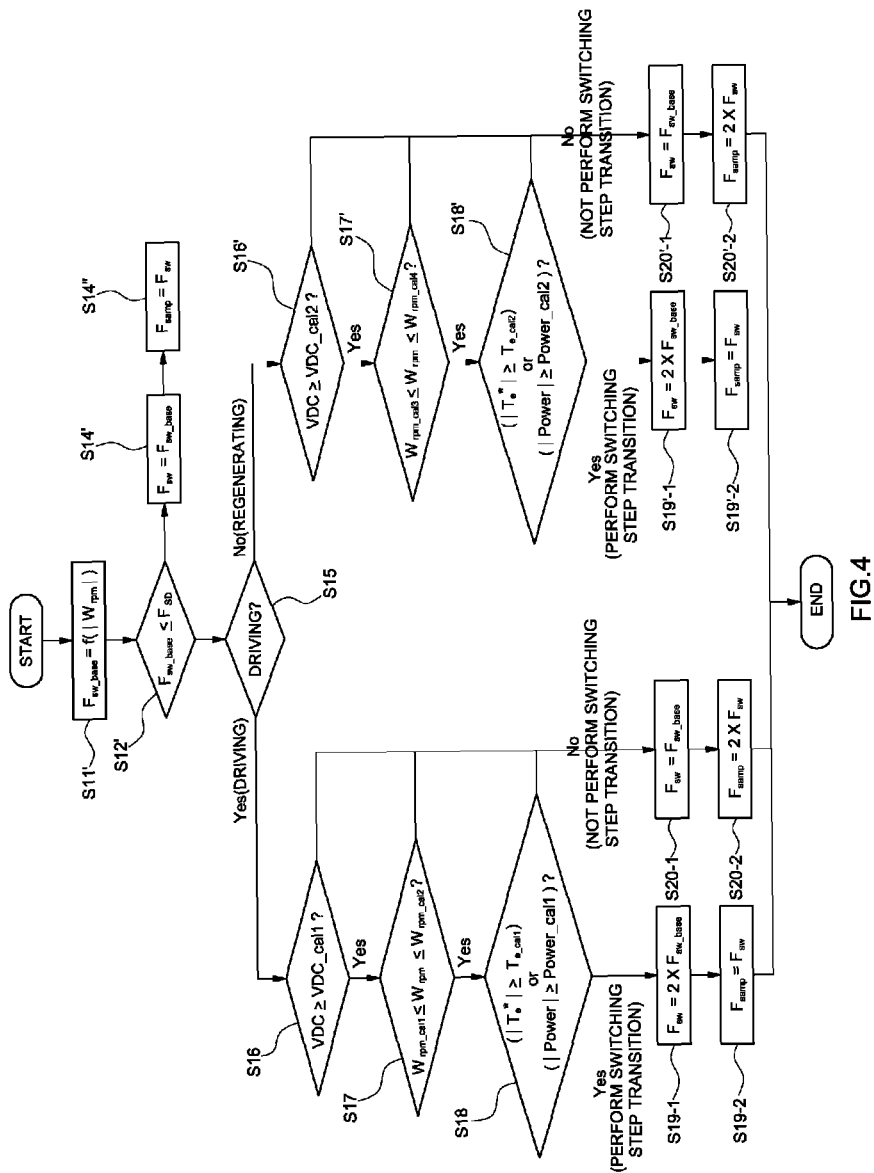
FIG. 4 is a flowchart showing an inverter control method according to a second exemplary embodiment of the present invention.
Figure 5:
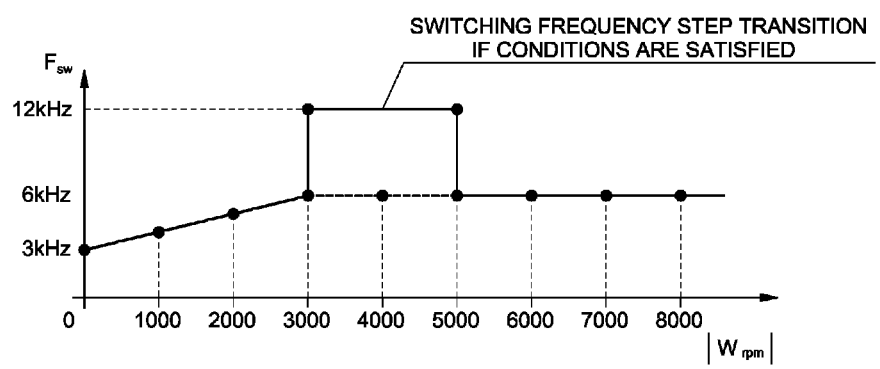
FIG. 5 is a diagram showing a state where a switching frequency is variable-controlled (step-transition-controlled) in an inverter control method according to a second exemplary embodiment of the present invention.

FIG. 4 is a flowchart showing an inverter control method according to the second exemplary embodiment of the present invention, and FIG. 5 is a diagram showing a state where the switching frequency is variable-controlled (step-transition-controlled) in the inverter control method according to the second exemplary embodiment of the present invention.

Figure 6:
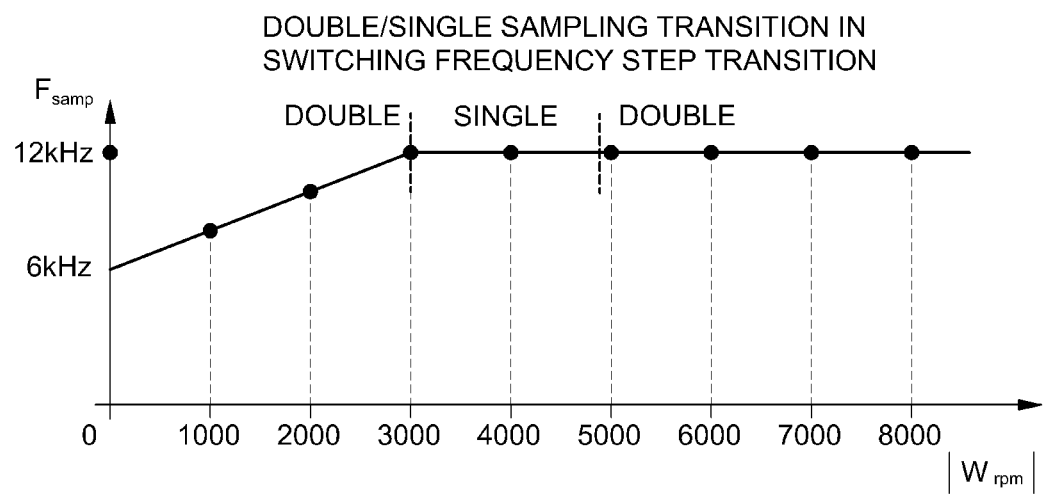
FIG. 6 is a diagram schematically showing that single sampling/double sampling transition is made as step transition of a switching frequency is made in an inverter control method according to a second exemplary embodiment of the present invention.

FIG. 6 is a diagram schematically showing that single sampling/double sampling transition is made as step transition of the switching frequency is made in the inverter control method according to the second exemplary embodiment of the present invention.

As shown in FIG. 4, the controller monitors the current motor speed $W_{rpm}$, and determines a base switching frequency $F_{sw\_base}$ according to the current motor speed $W_{rpm}$ in step S11'. The base switching frequency $F_{sw\_base}$ is determined as a function of an absolute value of the motor speed $W_{rpm}$, that is, $|W_{rpm}|$, and to this end, data information which previously defines a base switching frequency corresponding to a motor speed (e.g., functional formula (equation) information which defines a relationship between a motor speed and a switching frequency) may be used, and by using the data information (previously stored in a memory of the controller), the controller determines the base switching frequency $F_{sw\_base}$ corresponding to the current motor speed $W_{rpm}$.

The data information may be similar with that of the first embodiment shown in FIG. 2, in which the base switching frequency $F_{sw\_base}$ is set higher as the motor speed $W_{rpm}$ increases. That is, as the motor speed (an absolute value thereof) in the data information increases, the base switching frequency corresponding to the motor speed is proportionally set higher, and in actual vehicle control, the base switching frequency is determined from the data information to be a value which continuously changes proportionally to the motor speed change.

As such, once the base switching frequency $F_{sw\_base}$ is determined according to the motor speed $W_{rpm}$, the base switching frequency $F_{sw\_base}$ is compared with a previously set reference frequency $F_{SD}$ in step S12'. When the base switching frequency $F_{sw\_base}$ exceeds the reference frequency $F_{SD}$, the switching frequency $F_{sw}$ actually used in inverter control is finally determined to be the base switching frequency ($F_{sw\_base}=F_{sw}$) in step S14'.

Like in the first exemplary embodiment, the inverter is controlled in the single-sampling mode ($F_{samp}=F_{sw}$) in which the sampling frequency $F_{samp}$ is determined to be equal to the switching frequency $F_{sw}$ for use in step S14". The second exemplary embodiment further provides sophisticatedly segmented control logic in which the controller determines whether the current motor operation state is in a driving operation state or a regenerating operation state and the switching frequency $F_{sw}$ and the sampling frequency $F_{samp}$ are determined from the base switching frequency $F_{sw\_base}$ separately for the driving operation state and the regenerating operation state.

In addition, in the second embodiment, it is determined whether to conduct step transition of the switching frequency and the single-sampling mode or the double-sampling mode is selected, according to the current inverter input voltage, motor speed, torque command, or inverter power. That is, when the motor is in the driving operation state, when three conditions all are satisfied: i.) an inverter input voltage VDC is greater than a preset first reference voltage VDC_cal1; ii.) the motor speed $W_{rpm}$ (e.g., an absolute value thereof) is a value in a preset first speed range (a value between a first reference speed $W_{rpm\_cal1}$ and a second reference speed $W_{rpm\_cal2}$); and iii.) an absolute value of a torque command, $|T_e^*|$ is greater than a first reference torque $T_{e\_cal1}$ or an absolute value of the inverter power, |Power|, is greater than a first reference power Power_cal1, then the switching frequency $F_{sw}$ is finally determined to be two times the base switching frequency, $2\times F_{sw\_base}$ and step transition of the switching frequency used in inverter control ($F_{sw}=F_{sw\_base}$) is conducted in steps S16, S17, S18, and S19-1. For the sampling frequency $F_{samp}$, the single-sampling mode ($F_{samp}=F_{sw}$) is used, that is, the sampling frequency $F_{samp}$ is set equal to the switching frequency for use in inverter control, in step S19-2.

On the other hand, when any one of the three conditions is not satisfied, the switching frequency is finally determined to the base switching frequency without step transition of the switching frequency ($F_{sw}=F_{sw\_base}$), in step S20-1, and in this case, for the sampling frequency $F_{samp}$, control is performed in the double-sampling mode ($F_{samp}=2\times F_{sw}$) in step S20-2. In other words, frequency which is two times the switching frequency is determined as the sampling frequency and is used for inverter control.

When the motor is in the regenerating operation state, three conditions all are satisfied: the inverter input voltage VDC is greater than a preset second reference voltage VDC_cal2; the motor speed $W_{rpm}$ (an absolute value thereof) is a value in a preset second speed range (a value between a third reference speed $W_{rpm\_cal3}$ and a fourth reference speed $W_{rpm\_cal4}$); and an absolute value of a torque command, $|T_e^*|$ is greater than a second reference torque $T_{e\_cal2}$ or an absolute value of the inverter power, |Power|, is greater than a second reference power Power_cal2, then the switching frequency $F_{sw}$ is finally determined to be two times the base switching frequency, $2\times F_{sw\_base}$ and step transition of the switching frequency used in inverter control ($F_{sw}=F_{sw\_base}$) is conducted in steps S16', S17', S18', and S19'-1. For the sampling frequency $F_{samp}$, the single-sampling mode ($F_{samp}=F_{sw}$) is used, that is, the sampling frequency $F_{samp}$ is set equal to the switching frequency for use in inverter control, in step S19'-2.

When any one of the three conditions is not satisfied, the switching frequency is finally determined to the base switching frequency without step transition of the switching frequency ($F_{sw}=F_{sw\_base}$), in step S20'-1, and in this case, for the sampling frequency $F_{samp}$, control is performed in the double-sampling mode ($F_{samp}=2\times F_{sw}$) in step S20'-2. In this way, the switching frequency and the sampling frequency may be determined from the base switching frequency separately for the driving operation and the regenerating operation of the motor, and in this case, for application to the motor's driving operation and regenerating operation, the reference voltage (i.e., the first reference voltage and the second reference voltage, respectively), the speed range (i.e., the first speed range and the second speed range, respectively), the reference torques (i.e., the first reference torque and the second reference torque, respectively), and the reference power (i.e., the first reference power and the second reference power, respectively) may be set to different values, respectively.

Thus, in the second exemplary embodiment, according to current motor operation state information regarding the driving operation and the regenerating operation, which includes the inverter input voltage, the motor speed, torque command, or inverter power, step transition of the switching frequency and single/double sampling transition are made variably.

Referring to FIG. 5, the three conditions are satisfied in a particular-speed area of the motor, such that step transition of the switching frequency $F_{sw}$ is made, and in this case, the switching frequency has a control pattern which discontinuously varies. In contrast to the first exemplary embodiment in which discontinuous single/double sampling transition is made as shown in FIG. 3, in the second exemplary embodiment, a continuous sampling pattern as shown in FIG. 6 is provided by single/double sampling transition made in the to foregoing manner.

Also in the second exemplary embodiment, the switching frequency is properly changed according to the motor operation state and proper transition between the double-sampling mode and the single-sampling mode is made for the sampling frequency, thereby achieving overall improvements in terms of switching loss, electromagnetic performance, NVH performance, control stability, and so forth when compared to a conventional case in which one switching frequency and one sampling frequency are used over the entire operation area. Therefore, with the inverter control method according to the present invention, the switching frequency is properly changed according to the motor operation state and proper transition between the double-sampling mode and the single-sampling mode is made for the sampling frequency, thereby achieving overall improvements in terms of switching loss, electromagnetic performance, NVH performance, control stability, and so forth when compared to a conventional case in which one switching frequency and one sampling frequency are used over the entire operation area.

While the embodiments of the present invention have been described in detail, the scope of the present invention is not limited to the foregoing embodiments, and various modifications and improvements made by those of ordinary skill in the art by using the base concept of the present invention defined in the appended claims are also included in the scope of the present invention.

What is claimed is:

1. An inverter control method for an eco-friendly vehicle which generates a pulse width modulation (PWM) signal according to a switching frequency and a sampling frequency and controls ON/OFF driving of a switching element,
    wherein a controller changes and sets the switching frequency according to a current motor speed, changes and sets a sampling frequency according to the switching frequency, and controls on/off driving of a switching element according to the switching frequency corresponding to the current motor speed and the sampling frequency
    wherein the switching frequency is compared with a predetermined reference frequency, such that when the switching frequency is lower than the predetermined reference frequency, double-sampling control is performed in which a frequency which is two times the switching frequency that is set according to the current motor speed is used as the sampling frequency, and
    when the switching frequency exceeds the predetermined reference frequency, single-sampling control is performed in which a frequency which is equal to the switching frequency is used as the sampling frequency.

2. The inverter control method of claim 1, wherein the switching frequency is changed and set in proportion to a change of the motor speed.

3. The inverter control method of claim 1, wherein the switching frequency is set higher as the motor speed increases.

4. An inverter control method for an eco-friendly vehicle which generates a pulse width modulation (PWM) signal according to a switching frequency and a sampling frequency and controls ON/OFF driving of a switching element,
    wherein after a controller determines a base switching frequency according to a current motor speed, the controller changes and sets the switching frequency and a sampling frequency to values corresponding to a current motor operation state from the base switching frequency, and controls on/off driving of a switching element according to the switching frequency and the sampling frequency.

5. The inverter control method of claim 4, wherein the base switching frequency is changed and set in proportion to a change of the motor speed.

6. The inverter control method of claim 4, wherein the base switching frequency is set higher as the motor speed increases.

7. The inverter control method of claim 4, wherein the base switching frequency is compared with a predetermined reference frequency, such that when the base switching frequency is lower than the predetermined reference frequency, the switching frequency and the sampling frequency are changed and set to values corresponding to current motor operation state information.

8. The inverter control method of claim 4, wherein if the base switching frequency exceeds the predetermined reference frequency, a frequency equal to the base switching frequency is determined and used as the switching frequency and the sampling frequency.

9. The inverter control method of claim 7, wherein the motor operation state information comprises an inverter input voltage, a motor speed, a torque command, or an inverter power.

10. The inverter control method of claim 9, wherein when a condition in which the inverter input voltage is greater than a reference voltage, a condition in which the motor speed is in a predetermined speed range, and a condition in which an absolute value of the torque command is greater than a reference torque or an absolute value of the inverter power is greater than a reference power are all satisfied, then the switching frequency is set to a frequency that is two times the base switching frequency and the sampling frequency is set to a frequency that is equal to the switching frequency.

11. The inverter control method of claim 9, wherein if any one of a condition in which the inverter input voltage is greater than a reference voltage, a condition in which the motor speed is in a predetermined speed range, and a condition in which an absolute value of the torque command is greater than a reference torque or an absolute value of the inverter power is greater than a reference power is not satisfied, then the switching frequency is set to a frequency that is equal to the base switching frequency and the sampling frequency is set to a frequency that is two times the switching frequency.

12. The inverter control method of claim 10, wherein the motor operation state information further comprises driving operation/generating operation states of the motor, and
    the controller is configured to determine whether the current motor operation state is the driving operation state or the regenerating operation state and to determine whether the conditions are satisfied in the determined operation state, and
    for application to the motor's driving operation and regenerating operation, the reference voltage, the speed range, the reference torque, and the reference power are set to different values, respectively, by the controller.

* * * * *